3,186,986
EPOXY ESTRANES AND PROCESSES FOR THE
MANUFACTURE THEREOF
Theodore Legatt, Bloomfield, and Elliot L. Shapiro, Cedar Grove, N.J., assignors to Schering Corporation, Bloomfield, N.J., a corporation of New Jersey
No Drawing. Filed Aug. 22, 1963, Ser. No. 303,938
10 Claims. (Cl. 260—239.55)

This invention relates to compositions of matter identified as 3-keto-4,5-oxido-10-oxyestranes, intermediates leading thereto and to processes for the manufacture thereof.

The invention sought to be patented in one of its composition aspects is described as residing in the concept of a chemical compound having a molecular structure in which there is attached to a 3-keto-estrane nucleus a hydroxy or lower alkanoyloxy group at the 10-position, a hydroxy or lower hydrocarbyloxy group at the 17$\beta$-position, at the 17$\alpha$-position a member of the group consisting of lower alkyl, lower alkenyl, lower alkynyl and halo-lower alkynyl, said nucleus having a further substituent in the form of an oxido group at the 4,5-position.

The invention sought to be patented in another of its composition aspects is described as residing in the concept of a chemical compound having a molecular structure described above except that the substituent at the 17-position is keto.

The invention sought to be patented in one of its process aspects is described as residing in the concept of treating a 3-keto-10-hydroperoxy (or lower alkanoylperoxy)-4-estrene with base whereby rearrangement to a 3-keto-4,5-oxido-10-hydroxyestrane occurs. The invention sought to be patented in another of its process aspects is described as residing in the concept of treating a 3-keto-10-hydroxy (or alkanoyloxy)-4-estrene with alkaline hydrogen peroxide whereby epoxidation of the 4,5-double bond occurs.

Representative of the substituents appearing in the 17$\alpha$-position are lower alkyl such as methyl, ethyl, propyl (of which methyl and ethyl are preferred), lower alkenyl such as vinyl, allyl, and the like, lower alkynyl such as ethinyl, propargyl and halo-lower alkynyl such as chloroethinyl and trifluoromethylethinyl. The 17$\beta$-substituent is preferably hydroxy but may be also an ester of a hydrocarbon carboxylic acid having up to eight carbon atoms such as acetoxy, propionoyloxy, benzoyloxy and the like.

Other substituents may appear elsewhere in the nucleus. For example, a methyl group ($\alpha$ or $\beta$) may be present at the 6- and/or 16-position, an oxygen function such as hydroxy or keto may be present at the 11-position, halogen may be present at one or more of the 6-, 9-, and 11-positions. These nuclear substituents do not materially alter the general utility and usefulness of the unadorned molecular structure, differences noted being in degree rather than kind.

The novel compounds containing a 17$\alpha$-alkynyl group, as exemplified by 4,5-oxido-10-hydroxy-17$\alpha$-ethinyl-estrane-17$\beta$-ol-3-one are of value as progestational agents and as anti-fertility agents. The other 17$\beta$-hydroxy compounds including those bearing a 17$\alpha$-lower alkyl or 17$\alpha$-lower alkenyl group exhibit valuable anabolic/androgenic ratios are thus useful in eliciting a metabolic effect. They are also of value as anti-androgens. The 17-keto compounds also are anti-androgenic and elicit hypocholesteremic response.

The novel compounds of this invention are prepared by treating a 3-keto-10-hydroperoxy-4-estrene with base whereupon rearrangement occurs resulting in the formation of the corresponding 3-keto-4,5-oxido-10-hydroxyestrane. The starting material, that is, the 10-hydroperoxy estrene preferably already contains the desired substituents at C-17. These starting materials are prepared as described in our co-pending application Serial No. 252,068, filed January 17, 1963. This method of rearrangement of a 10-hydroperoxy-3-keto-4-estrene gives rise primarily to a 4$\beta$,5$\beta$-oxido product. The base utilized in the reaction is preferably an alkali metal hydroxide, such as sodium hydroxide; however, other bases such as sodium (or potassium) carbonate and bicarbonate may also be used. Indeed, in place of a 10-hydroperoxy group there may be employed an ester thereof, such as a 10-lower alkanoyloxy substituted starting material. With an excess of strong base the ester is cleaved and the rearrangement proceeds as described.

An alternate method for preparing the novel compounds of this invention is that involving the alkaline peroxide treatment of a 3-keto-10-hydroxy-4-estrene (or ester thereof) which already bears the aforementioned substituent(s) at C-17. These latter starting materials and methods for the manufacture thereof are already known in the art.

The following examples are illustrative of the methods of synthesis of the novel compounds of this invention.

EXAMPLE 1

*17$\alpha$-ethinyl-4$\beta$,5$\beta$-oxido-10$\beta$,17$\beta$-dihydroxy-estrane-3-one*

Suspend 9 g. of 17$\alpha$-ethinyl-10$\beta$-hydroperoxy-17$\beta$-hydroxy-4-estrene-3-one in 270 ml. of 90% aqueous methanol. Add a solution of 2.5 g. of sodium hydroxide in 32 ml. of methanol and 8 ml. of water. Stir at room temperature until most of the suspended material is in solution and then stir for an additional 10 minutes. Pour the mixture into water, containing 8 ml. of acetic acid, and extract with ethyl acetate. Evaporate the organic layer to a residue consisting essentially of the compound of this example. Purify by crystallization from acetone-hexane, or methylene chloride-ether. Alternatively, purification may be effected by chromatography on silica gel and by elution with increasing percentages of ether in hexane. The like fractions as evidenced by infrared, ultraviolet spectroscopy, and thin layer chromatography are combined and the product crystallized from acetone-hexane. M.P. 254–257° C., $[\alpha]_D$ +45.1 (methanol).

Alternatively, the following procedure may be employed:

Add 0.9 ml. of chilled 30% hydrogen peroxide to a solution of 0.15 g. of 17$\alpha$-ethinyl-10$\beta$,17$\beta$-dihydroxy-4-estrene-3-one in 12 ml. of methanol. Maintain the temperature at 0–5° C.; then add 0.3 ml. of 10% aqueous sodium hydroxide. Maintain the temperature at 0–5° C. for approximately 45 hours. Add methylene chloride, separate and wash the organic layer with water. Evaporate the organic layer to a residue consisting substantially of the 4,5-oxide. Chromatography over silica gel may be used to separate the 4$\beta$,5$\beta$-epoxide from the 4$\alpha$,5$\alpha$-epoxide, which may be crystallized from acetone-hexane.

EXAMPLE 2

*4$\beta$,5$\beta$-oxido-10$\beta$,17$\beta$-dihydroxy-estrane-3-one*

Add 1 g. of 10-hydroperoxy-17$\beta$-hydroxy-4-estrene-3-one to a mixture of 100 mg. of sodium carbonate, 30 ml. of methanol, 4 ml. of water, and 0.1 g. of sodium carbonate. Work up as described in Example 1. Purify by chromatography using silica gel and eluting with increasing percentages of ether in hexane. Combine like fractions obtaining 4$\beta$,5$\beta$-oxido-17$\beta$-hydroxy-estrane-3-one which is further purified by crystallization from isopropyl ether, M.P. 166–168° C., $[\alpha]_D$ +118.3 (dioxane).

Alternatively, the compound of this example is prepared as follows:

React 0.15 g. of 10β,17β-dihydroxy-4-estrene-3-one with alkaline hydrogen peroxide and work up as in Example 1. Purify by chromatography on silica gel eluting with increasing percentages of ether in hexane and combining like fractions (as evaluated by infrared, thin layer chromatography and ultraviolet spectroscopy). There is obtained 4β,5β-oxido-17β-hydroxy-estrane-3-one and 4α,5α-oxido-17β-hydroxy-estrane-3-one, which are further purified by crystallization from acetone-hexane.

EXAMPLE 3

*4β,5β-oxido-10β,17β-dihydroxy-estrane-3-one 17-acetate*

Add 70 mg. of 4β,5β-oxido-10β,17β-dihydroxy-estrane-3-one to a solution of 0.3 ml. of pyridine and 0.2 ml. of acetic anhydride. Maintain at room temperature overnight then dilute with water. Extract with methylene chloride and evaporate the organic layer to a residue which consists substantially of the ester of this example. Recrystallize from ether-hexane. M.P. 173–176° C., [α]$_D$ +98.6 (dioxane).

The foregoing examples describe methods by which the novel estranes of this invention may be prepared. It is apparent that by substituting a different 10-hydroperoxy-estrene for the reactant set forth in Example 1 or Example 2 or by substituting a different 10β-hydroxy-estrene set forth in said examples and following the procedure described therein, the corresponding 4,5-oxido product is obtained. Thus, in Example 1 by substituting 17α-methyl-10-hydroperoxy-17β-hydroxy-4-estrene-3-one for the 17α-ethinyl reactant of Example 1 and following the procedure described therein, there is obtained 17α-methyl-4β,5β-oxido-10β,17β-dihydroxy-estrane-3-one. By similar substitution of reactants, one obtains 17α-ethyl-4β,5β-oxido-10β,17β-dihydroxy-estrane-3-one, 17α-propyl-4β,5β-oxido-10β,17β-dihydroxy-estrane-3-one, 17α-vinyl-4β,5β-oxido-10β,17β-dihydroxy-estrane-3-one, 17α-chloroethinyl-4β,5β-oxido-10β,17β-dihydroxy-estrane-3-one, and 17α-trifluoromethylethinyl - 4β,5β - oxido - 10β,17β - dihydroxy - estrane-3-one and the 4β,5β - oxido - 10β - hydroxy-estrane-3,17-dione. The hydroperoxy starting materials, as indicated heretofore, are prepared as described in our copending application Serial No. 252,068, filed January 17, 1963.

In place of the 10-hydroperoxy starting materials there may be employed esters thereof such as the 10-peroxyacetyl analogs. When these are subjected to the reaction described in Example 1 utilizing a proportionate increase of alkali, the corresponding 4β,5β-oxido-10β,17β-dihydroxy-estrane-3-one is obtained.

The foregoing compounds are also obtained according to the alternate procedure of Example 1 utilizing compounds having appropriate substituents at the 17α-position in place of the 17α-ethinyl compound described for the reactant in said procedure. Thus, by starting with 17α-methyl-10β,17β-dihydroxy-4-estrene - 3 - one, or the 17α-ethyl analog, or the 17α-propyl analog, or the 17α-vinyl analog, or the 17α-chloroethinyl analog, or the 17α-trifluoromethylthinyl analog and subjecting such reactant to the action of alkaline hydrogen peroxide, a mixture of the respective 4,5-epoxide is obtained which may be separated into the 4β,5β-epoxide and 4α,5α-epoxide, respectively, for each of the above reactants by the method described herein.

The esterification procedure described in Example 3 is equally applicable to any of the products produced above containing a 17β-hydroxy group. In place of acetic anhydride there may be used other esterifying agents such as acetyl chloride, benzoyl chloride, propionyl chloride, and the like which give rise to the corresponding 17-ester when used in the equivalent quantities and under the similar conditions of Example 3. With an excess of esterifying agent both the 17-hydroxy group and the 10-hydroxy group will be esterified. These esters have properties similar to those of the unesterified compound but allow for a prolongation of action in view of their reduced solubility in aqueous systems.

We claim:

1. A compound of the formula:

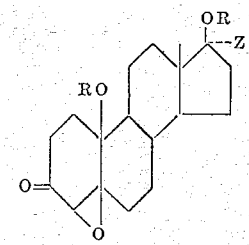

wherein R is a member of the group consisting of hydrogen and lower alkanoyl; and Z is a member of the group consisting of hydrogen, lower alkyl, lower alkenyl, lower alkynyl and halo-lower alkynyl.

2. 17α-ethinyl-4β,5β-oxido-10β,17β-dihydroxy - estrane-3-one.

3. 17α-methyl-4β,5β-oxido-10β,17β-dihydroxy - estrane-3-one.

4. 17α-ethyl-4β,5β-oxido-10β,17β-dihydroxy-estrane - 3-one.

5. 17α-vinyl-4β,5β-oxido-10β,17β-dihydroxy-estrane - 3-one.

6. 17α-chloroethinyl-4β,5β-oxido - 10β,17β - dihydroxy-estrane-3-one.

7. 4β,5β-oxido-10β,17β-dihydroxy-estrane-3-one.

8. 17-lower alkanoyl ester of 4β,5β-oxido-10β,17β-dihydroxy-estrane-3-one.

9. 4,5-oxido-10β-hydroxy-estrane-3,17-dione.

10. In the process for preparing a 3-keto-4,5-oxido-10β-hydroxy-estrane and the alkanoyl esters thereof, the step which comprises reacting a 3-keto-10-hydroperoxy-4-estrene with a member of the group consisting of alkali metal hydroxide, alkali metal bicarbonate and alkali metal carbonate.

References Cited by the Examiner

Mancera et al.: "Can. J. Chem." 37 (1959), page 1785.

LEWIS GOTTS, *Primary Examiner.*